(12) United States Patent
Grenning

(10) Patent No.: US 10,107,656 B1
(45) Date of Patent: Oct. 23, 2018

(54) FLOW-RATE MEASUREMENT NOZZLE WITH VELOCITY PRESSURE PICKUP CHANNEL

(71) Applicant: Frederick H. Grenning, Lake Bluff, IL (US)

(72) Inventor: Frederick H. Grenning, Lake Bluff, IL (US)

( * ) Notice: Subject to any disclaimer, the term of this patent is extended or adjusted under 35 U.S.C. 154(b) by 0 days.

(21) Appl. No.: 15/787,486

(22) Filed: Oct. 18, 2017

(51) Int. Cl.
*G01F 1/42* (2006.01)

(52) U.S. Cl.
CPC ..................................... *G01F 1/42* (2013.01)

(58) Field of Classification Search
CPC ..... G01F 1/42; G01F 1/44; G01F 1/74; G01F 1/88; G01F 1/383
See application file for complete search history.

(56) References Cited

U.S. PATENT DOCUMENTS

| 2,564,272 | A | | 8/1951 | Morton |
| 3,736,797 | A | * | 6/1973 | Brown ...................... G01F 1/44 73/861.64 |
| 3,918,305 | A | | 11/1975 | Benedict |
| 4,343,193 | A | | 8/1982 | Dawson et al. |
| 4,555,952 | A | | 12/1985 | Jenkins |
| 6,874,375 | B1 | | 4/2005 | Grenning |
| 7,607,361 | B2 | * | 10/2009 | Unalmis ................... G01F 1/74 73/861.61 |
| 7,917,324 | B2 | | 3/2011 | Hurley |
| 7,983,869 | B1 | | 7/2011 | Hurley |
| 8,150,555 | B2 | | 4/2012 | Hinami et al. |
| 8,401,811 | B1 | | 3/2013 | Hurley |
| 8,701,497 | B2 | * | 4/2014 | Grenning .................. G01F 1/88 73/716 |
| 8,712,591 | B2 | | 4/2014 | Receveur |
| 9,205,293 | B2 | | 12/2015 | Grenning |
| 2010/0163123 | A1 | | 7/2010 | Earle |
| 2012/0006119 | A1 | * | 1/2012 | Broden ................... G01F 1/383 73/716 |
| 2012/0226449 | A1 | | 9/2012 | Delache et al. |
| 2012/0239336 | A1 | | 9/2012 | Delache et al. |
| 2013/0253857 | A1 | | 9/2013 | Hershey |
| 2014/0124057 | A1 | | 5/2014 | Freund et al. |

* cited by examiner

*Primary Examiner* — Jewel V Dowtin
(74) *Attorney, Agent, or Firm* — Miller, Matthias & Hull LLP

(57) ABSTRACT

Velocity pressure measuring apparatus and methods include a nozzle having a nozzle inlet end and a nozzle outlet end. A side wall of the nozzle extends along a nozzle axis and has an exterior surface and an interior surface. The interior surface defines a nozzle chamber and has a nozzle inlet cross-sectional area at the nozzle inlet end that is greater than a nozzle outlet cross-sectional area at the nozzle outlet end. A first pressure port extends through the side wall from the exterior surface of the nozzle to the interior surface of the nozzle, and includes a velocity pressure pickup channel extending along a channel axis oriented substantially parallel to the nozzle axis.

20 Claims, 6 Drawing Sheets

FLOW-RATE MEASUREMENT NOZZLE WITH VELOCITY PRESSURE PICKUP CHANNEL

FIELD OF THE DISCLOSURE

The present disclosure relates generally to fluid flow rate measurement, and more particularly to methods and apparatus for measuring differential pressure of a fluid in a fluid line to determine a flow rate of the fluid.

BACKGROUND OF THE DISCLOSURE

Fluid flow measuring devices and methods are known for use with fluid flow systems to measure pressure of a fluid flow, which may be converted into a fluid flow rate. A pitot tubes, for example, is a device commonly used to measure pressure of a fluid flowing through a fluid line. The pitot tube may be positioned to measure fluid pressure at a specific point within the fluid line, and typically includes an opening that may be placed in the stream of the fluid flow. To obtain an accurate reading, the pitot tube must be positioned so that the opening is located in the exact center of the stream and oriented parallel to the fluid flow path. A gauge may be operably coupled to the pitot tube to provide a pressure reading.

In a pitot tube, static pressure, which is atmospheric pressure in an open system, is compared to total pressure. Using Bernoulli's Equation, the pressure differential is then translated to a flow velocity. A gauge device may be graduated such that the readout is directly displayed as a fluid velocity.

Pitot tubes are commonly used where there is a desire to determine the flow rates of fluids for equipment testing. Fire pumps, in addition to other pumping equipment, often must be tested to ensure the equipment meets certain performance specifications, and therefore it is important to provide accurate devices and methods for determining fluid flow rates.

Many fire hydrant flow tests are conducted by taking a pitot reading directly from the nozzle on the fire hydrant. Due to inexact orifice diameter, excessive turbulence (which may cause fluctuations in the observed pressure level of +/−10 psi), and incorrect pitot tube positioning, these options give the least dependable readings.

Some devices integrate the pitot tube into the fluid line. A general problem with pitot tubes is that they are difficult to position to obtain accurate pressure readings. As noted above, the pitot tube must be positioned in the center of fluid flow and oriented parallel to the flow. As the pitot tube placement deviates from these requirements, the less accurate the pressure readings will be. Additionally, the pitot tube structure extends partially into the fluid line, and therefore is susceptible to damage by solids entrained in the fluid.

Conventional pitot tubes and other flow testing apparatus are also susceptible to inaccuracies due to turbulent fluid flow. Turbulence may be generated by valves, elbows, or other components that disrupt the flow of fluid through the pipe. Consequently, conventional devices typically require minimum lengths of straight pipe upstream and downstream of the flow testing apparatus to reduce turbulence and therefore improve accuracy of the data obtained by the flow testing apparatus.

More recently, the present applicant developed a pitotless nozzle disclosed in U.S. Pat. No. 6,874,375 to Grenning, which issued on Apr. 5, 2005. The pitotless nozzle includes a constant pressure nozzle that promotes laminar flow through the nozzle. Laminar flow has a relatively constant pressure profile, and therefore an accurate pressure reading may be obtained from a periphery of the flow, without requiring components that obstruct the fluid flow. While the pitotless nozzle of the '375 patent represented an improvement over prior devices, the range of flow-rates that it could measure was limited and improved accuracy of pressure measurements used to calculate flow-rates was still desired.

SUMMARY OF THE DESCRIPTION

In accordance with one aspect of the disclosure, apparatus is provided for measuring a velocity pressure of a fluid flowing through a fluid line having an upstream line connection. The apparatus includes a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end. A first pressure port extends through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall.

In accordance with another aspect of the disclosure, apparatus is provided for measuring a velocity pressure of a fluid flowing through a fluid line having an upstream line connection. The apparatus includes a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end, the interior surface tapering from the nozzle inlet end to the nozzle outlet end at a substantially constant rate of area reduction. A differential pipe has a pipe inlet end in fluid communication with the nozzle and a pipe outlet end, the differential pipe having a pipe interior surface defining a differential chamber fluidly communicating with the nozzle chamber. A first pressure port extends through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall. A second pressure port is formed in the differential pipe and fluidly communicating with the differential chamber.

In accordance with a further aspect of the present disclosure, a method is provided of measuring a velocity pressure of a fluid flowing through a fluid line having an upstream line connection. The method includes directing the fluid through a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end. The velocity pressure of the fluid is obtained by communicating a portion of the fluid flowing through the nozzle to a first pressure port extending through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE DISCLOSURE

Embodiments of testing equipment and methods used to measure a fluid flow through a fluid line are disclosed herein. The testing equipment includes a nozzle configured to generate a constant fluid pressure and having a first pressure port. A first pressure port extends through a side wall of the nozzle and includes a velocity pressure pickup channel facing the direction of fluid flow through the nozzle, so that a gauge coupled to the first pressure port can measure a velocity pressure of the fluid. By providing a channel through which velocity pressure of the fluid can be detected, the nozzle is capable of measuring an expanded range of fluid flow rates, and the flow rate measurements are more accurate across the entire range of fluid flow rates. In some embodiments, a differential chamber is coupled to the nozzle and includes a second pressure port positioned to communicate with the fluid immediately downstream of the nozzle, and a differential gauge may be operably coupled to the first and second pressure ports and configured to determine a pressure differential and/or a flow rate of the fluid.

Figure 1:
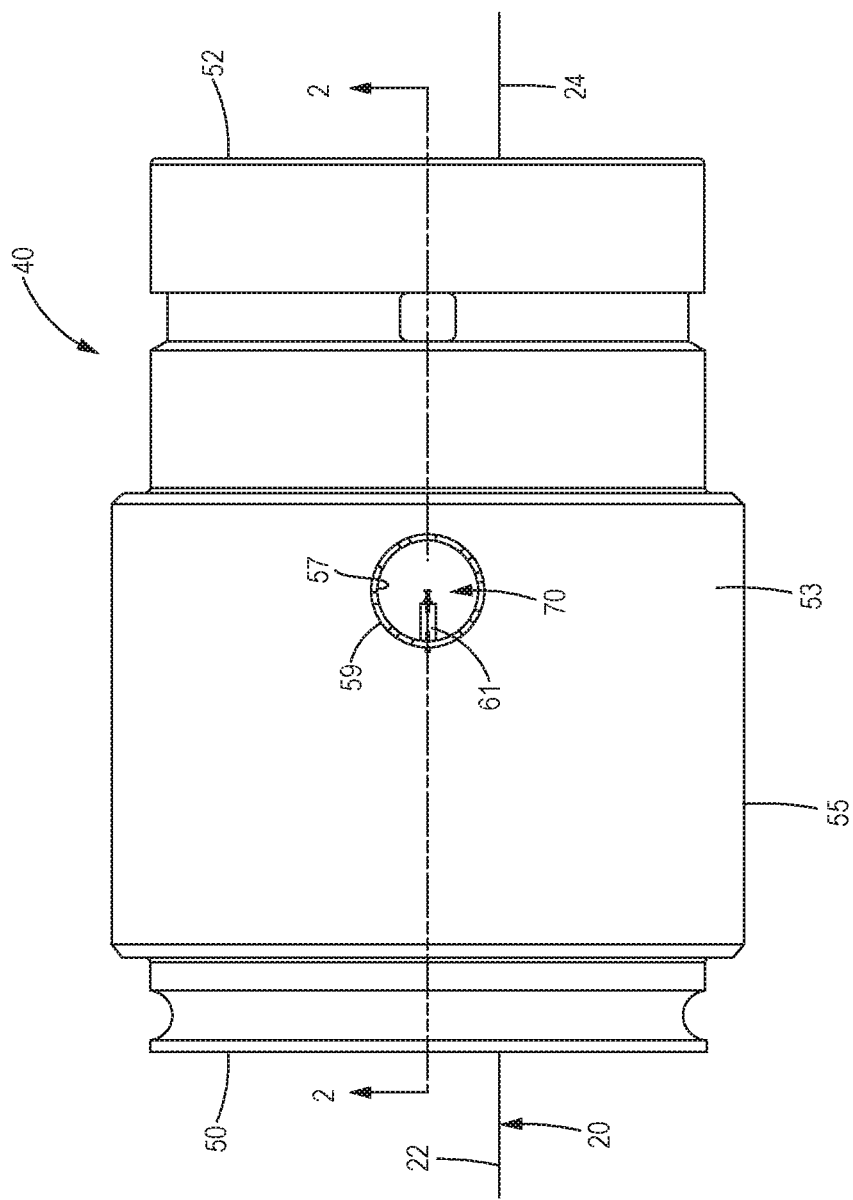
FIG. 1 is a top plan view of a nozzle according to the present disclosure.

FIG. 1 illustrates a first embodiment of apparatus for measuring a velocity pressure of a fluid in the form of a nozzle 40. The nozzle 40 may be placed in a fluid line 20 having an upstream line connection 22 and a downstream line connection 24. During operation, fluid travels from the upstream line connection 22, through the nozzle 40, and into the downstream line connection 24.

Figure 2:
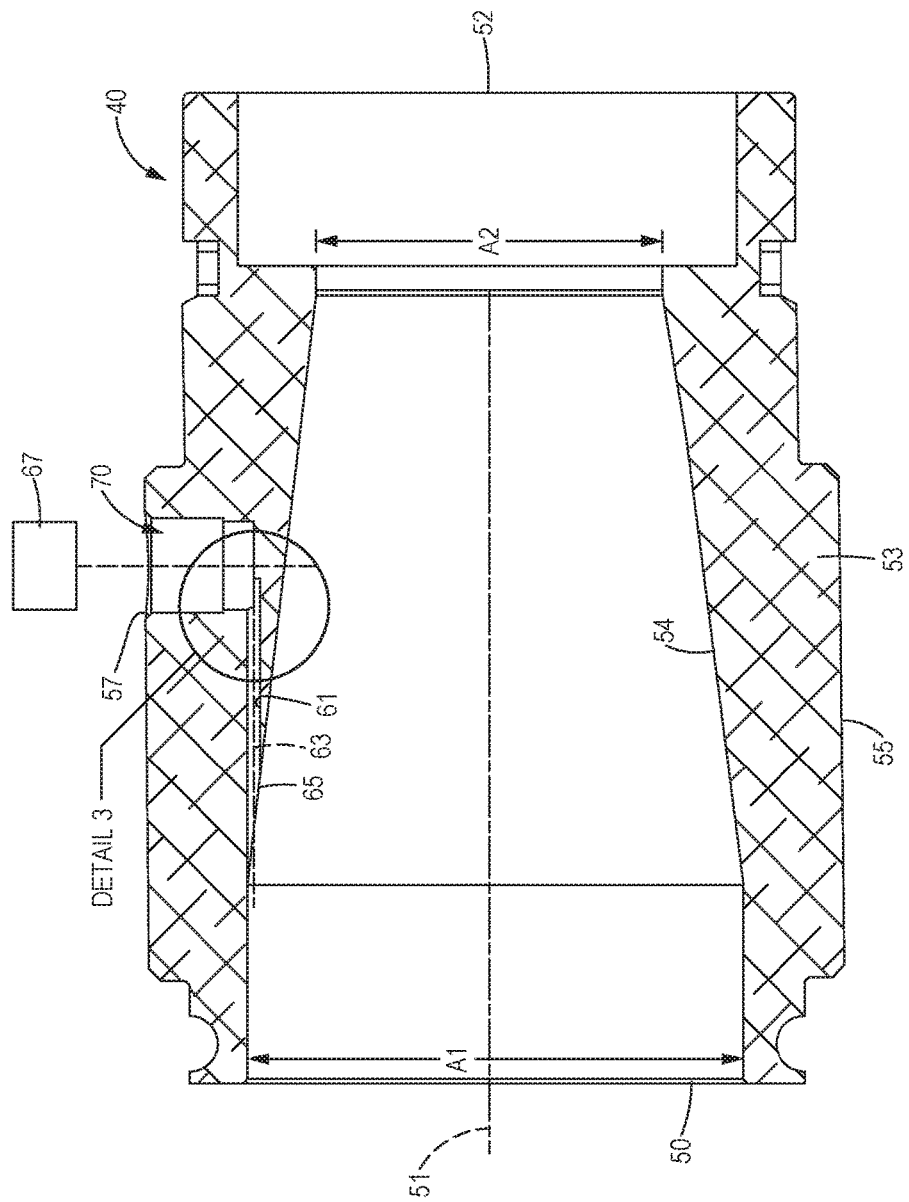
FIG. 2 is a cross sectional view of the nozzle taken along line 2-2 of FIG. 1.

The nozzle 40 includes a nozzle inlet end 50 that fluidly communicates with the upstream line connection 22, and a nozzle outlet end 52. As best shown in FIG. 2, the nozzle includes a side wall 53 extending along a nozzle axis 51 and having an interior surface 54 and an exterior surface 55. The interior surface 54 defines nozzle chamber 56 that extends from the nozzle inlet end 50 to the nozzle outlet end 52. The nozzle interior surface 54 has an inlet cross-sectional area "A1" at the nozzle inlet end 50 and an outlet cross-sectional area "A2" at the nozzle outlet end 52, wherein the inlet cross-sectional area "A1" is greater than the outlet cross-sectional area "A2". In the illustrated embodiment, the nozzle interior surface 54 tapers from the nozzle inlet end 50 to the nozzle outlet end 52 at a substantially constant rate of area reduction to produce a laminar flow through the nozzle 40.

Figure 3:
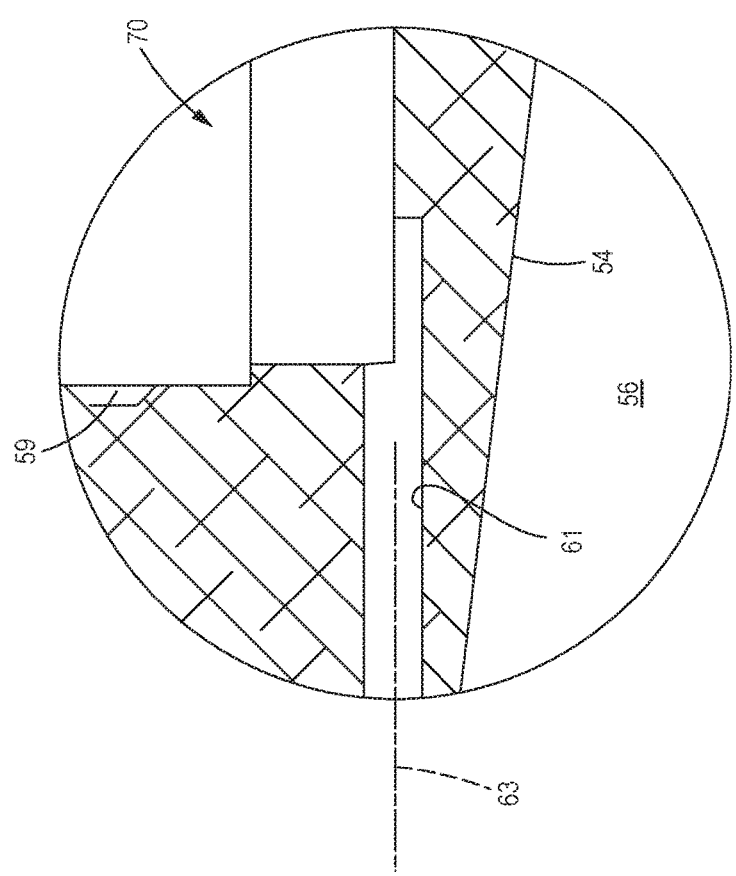
FIG. 3 is an enlarged cross-sectional view of a portion of the nozzle identified as Detail 3 in FIG. 2.

The nozzle 40 further includes a first pressure port 70 through which the pressure of the fluid may be measured. As best shown in FIGS. 2 and 3, the first pressure port 70 extends through the side wall 53, from the exterior surface 55 to the interior surface 54, to fluidly communicate with the nozzle chamber 56. The first pressure port 70 includes a first port outlet 57 formed at the exterior surface 55 of the side wall 53 and oriented substantially normal to the nozzle axis 51. The first port outlet 57 may be formed with internal threads 59.

The first pressure port 70 further includes a velocity pressure pickup channel 61 that extends along a channel axis 63 oriented substantially parallel to the nozzle axis 51. In some embodiments, the term "substantially parallel" is defined as two lines that are within 30 degrees of parallel. In other embodiments, the term "substantially parallel" is defined as two lines that are within 25 degrees of parallel. In yet further embodiments, the term "substantially parallel" is defined as two lines that are within 20 degrees of parallel. In still further embodiments, the term "substantially parallel" is defined as two lines that are within 15 degrees of parallel. In additional embodiments, the term "substantially parallel" is defined as two lines that are within 10 degrees of parallel. In further embodiments, the term "substantially parallel" is defined as two lines that are within 5 degrees of parallel.

As best shown in FIGS. 2 and 3, the velocity pressure pickup channel 61 includes a channel inlet 65 formed at the interior surface 54 of the side wall 53. Accordingly, the channel inlet 65 is oriented to face directly into the direction of fluid flow through the nozzle 40, thereby to fluidly communicate the velocity pressure of the fluid into the pickup channel 61. In the illustrated embodiment, the velocity pressure pickup channel 61 has a substantially uniform cross-sectional shape, as well as a substantially cross-sectional area that is small relative to the first port outlet 57.

Figure 6:
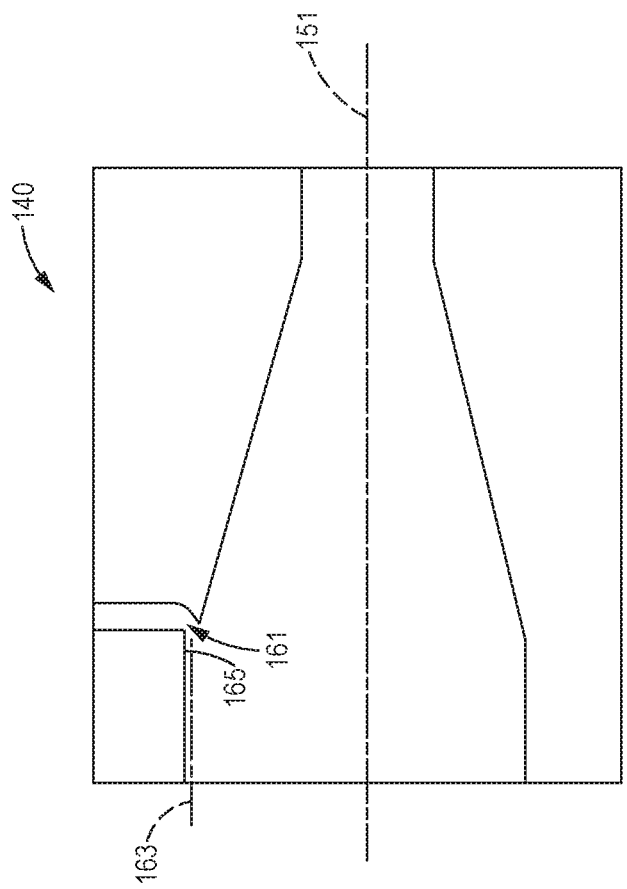
FIG. 6 is a side elevation view, in cross-section, of another embodiment of a nozzle according to the present disclosure.

FIG. 6 illustrates an alternative embodiment of a nozzle 140 having a velocity pressure pickup channel 161. In this embodiment, the velocity pressure pickup channel has a truncated channel inlet 165 that is shorter than that shown in FIGS. 2 and 3. The velocity pressure pickup channel 165, however, still extends along a channel axis 163 that is substantially parallel to a nozzle axis 151 of the nozzle 140.

A pressure gauge 67 may fluidly communicate with the pickup channel 61 to determine and communicate the velocity pressure of the fluid. The gauge, or another component operably coupled to the gauge, may further convert the velocity pressure into a flow rate of the fluid, such as by comparing the velocity pressure to atmospheric pressure.

Figure 4:
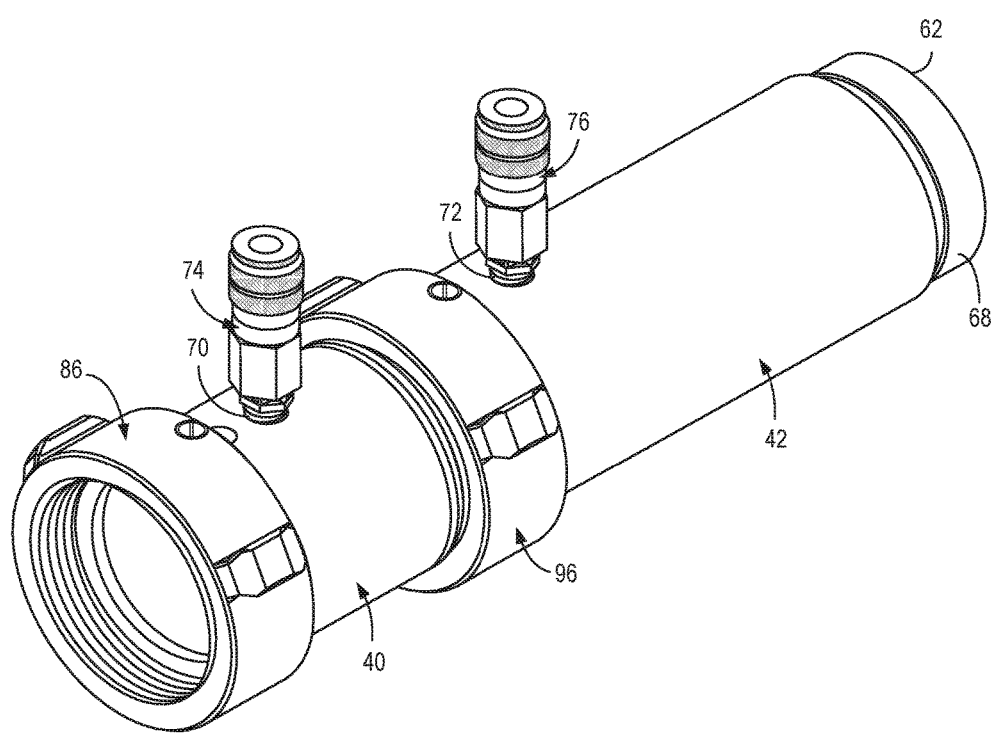
FIG. 4 is a perspective view of the nozzle of FIG. 1 in combination with a differential pipe.
Figure 5:
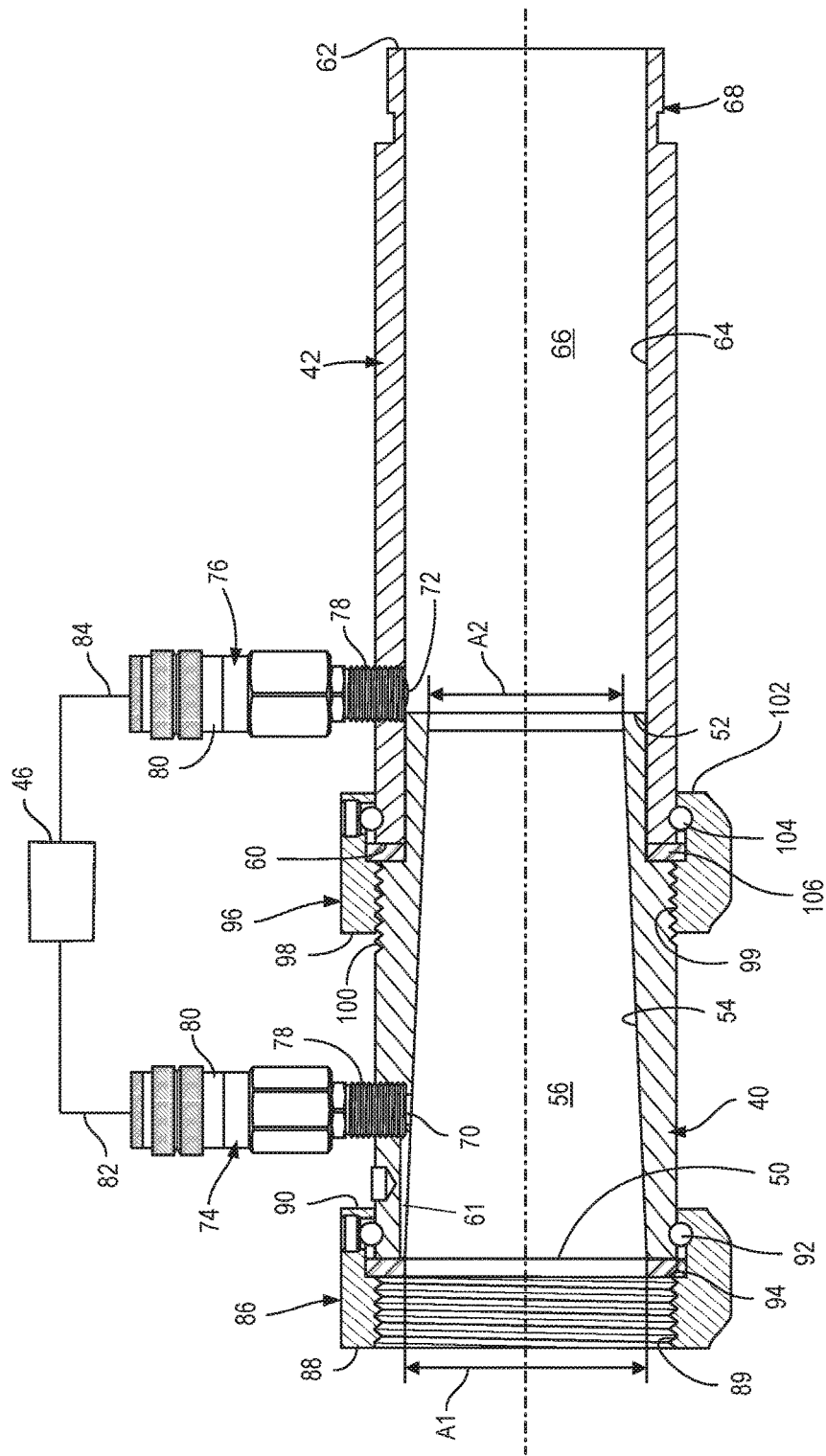
FIG. 5 is a side elevation view, in cross-section, of the nozzle and the differential pipe of FIG. 4.

In an alternative embodiment illustrated at FIGS. 4 and 5, the nozzle 40 is incorporated into a differential pressure assembly that also includes a differential pipe 42 and a differential gauge 46. The differential pipe 42 includes a pipe inlet end 60 that is coupled to the nozzle 40 and a pipe outlet end 62. The differential pipe 42 includes a pipe interior surface 64 defining a differential chamber 66 that fluidly communicates with the nozzle chamber 56. In the embodiment illustrated in FIGS. 4 and 5, the pipe outlet end 62 is formed with a hose coupling 68 that may be directly coupled to a downstream line connection, such as a hose. Alternatively, the differential pipe 42 may have a pipe outlet end 62 formed with external threads (not shown), which may be used for attachment to a discharge valve, an alternative hose, another portion of the existing fluid line 20, or other type of downstream line connection.

A second pressure port 72 is provided for obtaining a second gauge pressure of fluid flowing through the differential pressure assembly. The second pressure port 72 extends through a side of the differential pipe 42 to fluidly communicate with the differential chamber 66. The second pressure port 72 may be positioned so that it is aligned with the nozzle outlet end 52 when the differential pipe 42 is coupled to the nozzle 40, as best shown in FIG. 5.

First and second pressure couplings 74, 76 may be coupled to the first and second pressure ports 70, 72, respectively. In the illustrated embodiment, each of the first and second pressure couplings 74, 76 includes a threaded fitting 78 that is received by complementary threads formed in the first and second pressure ports 70, 72. A hose fitting 80 is coupled to the threaded fitting 78. Each hose fitting 80 is configured to receive a respective one of pressure hoses 82, 84. The first and second pressure hoses 82, 84 communicate the first and second gauge pressures from the first and second pressure ports 70, 72 to the differential gauge 46. In this embodiment, the first gauge pressure may be a velocity pressure of the fluid while the second gauge pressure may be a static pressure of the fluid. The differential gauge 46 is configured to determine a differential pressure between the first and second gauge pressures. For example, the differential gauge 46 may quantify the first and second gauge pressures and then determine the difference between those pressures. Additionally or alternatively, the differential gauge 46 may be configured to determine and display a fluid flow rate based on the differential pressure.

A nozzle coupling 86 may be provided for releasably attaching the nozzle 40 to the upstream line connection 22. In the exemplary embodiment, the nozzle coupling 86 includes a first end 88 having internal threads 89 for engaging complementary external threads (not shown) on the upstream line connection 22. The nozzle coupling 86 further includes a second end 90 that is rotatably coupled, such as by ball bearings 92, to the nozzle inlet end 50. Accordingly, the nozzle 40 may be rotated relative to the upstream line connection 22 without requiring complete disassembly. An inlet gasket 94 may be provided for sealing between the nozzle inlet end 50 and the upstream line connection 22.

Similarly, a pipe coupling 96 may be provided for releasably attaching the differential pipe 42 to the nozzle 40. As best shown in FIG. 5, the pipe coupling 96 includes a first end 98 having internal threads 99 for engaging complementary external threads 100 on the nozzle 40. The pipe coupling 96 further includes a second end 102 that is rotatably coupled, such as by ball bearings 104, to the nozzle outlet end 52. Accordingly, the differential pipe 42 may be rotated relative to the nozzle 40 without requiring complete disassembly. An outlet gasket 106 may be provided for sealing between the differential pipe 42 and the nozzle 40.

While only certain embodiments have been set forth, alternatives and modifications will be apparent from the above description to those skilled in the art. These and other alternatives are considered equivalents and within the spirit and scope of this disclosure and the appended claims.

What is claimed is:

1. Apparatus for measuring a velocity pressure of a fluid flowing through a fluid line having an upstream line connection, the apparatus comprising:
a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end; and
a first pressure port extending through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall.

2. The apparatus of claim 1, in which the interior surface tapers from the nozzle inlet end to the nozzle outlet end at a substantially constant rate of area reduction.

3. The apparatus of claim 1, in which the first pressure port further includes a first port outlet formed at the exterior surface of the side wall.

4. The apparatus of claim 3, further including a first pressure coupling coupled to the first port outlet.

5. The apparatus of claim 4, in which the first port outlet includes internal threads and the first pressure coupling includes a threaded fitting configured to threadably engage the internal threads of the first pressure port.

6. The apparatus of claim 1, further comprising a differential pipe having a pipe inlet end in fluid communication with the nozzle and a pipe outlet end, the differential pipe having a pipe interior surface defining a differential chamber fluidly communicating with the nozzle chamber.

7. The apparatus of claim 6, further comprising a second pressure port formed in the differential pipe and fluidly communicating with the differential chamber.

8. The apparatus of claim 7, further comprising a differential gauge operably coupled to the first and second pressure ports and configured to determine a differential pressure of the fluid.

9. The apparatus of claim 7, in which the second pressure port in the differential pipe is substantially aligned with the nozzle outlet end.

10. The apparatus of claim 6, further comprising a pipe coupling configured to releasably secure the pipe inlet end to the nozzle outlet end.

11. Apparatus for measuring a velocity pressure of a fluid flowing through a fluid line having an upstream line connection, the apparatus comprising:
a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end, the interior surface tapering from the nozzle inlet end to the nozzle outlet end at a substantially constant rate of area reduction;

a differential pipe having a pipe inlet end in fluid communication with the nozzle and a pipe outlet end, the differential pipe having a pipe interior surface defining a differential chamber fluidly communicating with the nozzle chamber;

a first pressure port extending through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall; and a second pressure port formed in the differential pipe and fluidly communicating with the differential chamber.

12. The apparatus of claim 11, in which the first pressure port further includes a first port outlet formed at the exterior surface of the side wall.

13. The apparatus of claim 12, further including a first pressure coupling coupled to the first port outlet.

14. The apparatus of claim 13, in which the first port outlet includes internal threads and the first pressure coupling includes a threaded fitting configured to threadably engage the internal threads of the first pressure port.

15. The apparatus of claim 11, further comprising a differential gauge operably coupled to the first and second pressure ports and configured to determine a differential pressure of the fluid.

16. The apparatus of claim 11, in which the second pressure port in the differential pipe is substantially aligned with the nozzle outlet end.

17. A method of measuring a velocity pressure of a fluid flowing through a fluid line having an upstream line connection, the method comprising:

directing the fluid through a nozzle having a nozzle inlet end fluidly communicating with the upstream line connection and a nozzle outlet end, the nozzle including a side wall extending along a nozzle axis from the nozzle inlet end to the nozzle outlet end, the side wall having an exterior surface and an interior surface, the interior surface defining a nozzle chamber and having a nozzle inlet cross-sectional area at the nozzle inlet end that is greater than a nozzle outlet cross-sectional area at the nozzle outlet end; and obtaining the velocity pressure of the fluid by communicating a portion of the fluid flowing through the nozzle to a first pressure port extending through the side wall from the exterior surface of the nozzle to the interior surface of the nozzle, the first pressure port including a velocity pressure pickup channel extending along a channel axis oriented substantially parallel to the nozzle axis and including a channel inlet formed at the interior surface of the side wall.

18. The method of claim 17, in which the interior surface tapers from the nozzle inlet end to the nozzle outlet end at a substantially constant rate of area reduction to produce a laminar flow of the fluid.

19. The method of claim 17, further comprising converting the velocity pressure into a fluid flow rate based on a comparison of the velocity pressure with atmospheric pressure.

20. The method of claim 17, in which the velocity pressure pickup channel includes a channel inlet formed at an interior surface of the nozzle.

* * * * *